(12) United States Patent
Nakano

(10) Patent No.: US 11,681,394 B2
(45) Date of Patent: Jun. 20, 2023

(54) DETECTING DEVICE AND DETECTION SYSTEM

(71) Applicant: Japan Display Inc., Tokyo (JP)

(72) Inventor: Fumihoru Nakano, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/723,847

(22) Filed: Apr. 19, 2022

(65) Prior Publication Data

US 2022/0350459 A1 Nov. 3, 2022

(30) Foreign Application Priority Data

Apr. 28, 2021 (JP) .............................. JP2021-076583

(51) Int. Cl.
*G06F 3/041* (2006.01)
*G06F 21/32* (2013.01)
*G06F 3/044* (2006.01)

(52) U.S. Cl.
CPC ........ *G06F 3/04182* (2019.05); *G06F 3/0445* (2019.05); *G06F 3/0446* (2019.05); *G06F 3/04166* (2019.05); *G06F 21/32* (2013.01)

(58) Field of Classification Search
CPC ............. G06F 3/04182; G06F 3/04166; G06F 3/0445; G06F 3/0446; G06F 21/32
USPC .................................................. 345/174, 60
See application file for complete search history.

(56) References Cited

U.S. PATENT DOCUMENTS

| 2006/0158202 | A1 | 7/2006 | Umeda et al. | |
| 2015/0097807 | A1* | 4/2015 | Lee | G06F 3/04166 345/174 |
| 2017/0046007 | A1* | 2/2017 | Kitagawa | G06F 3/0446 |

FOREIGN PATENT DOCUMENTS

| CN | 108255335 A | * | 7/2018 | ........... G06F 3/0418 |
| JP | 2005152223 A | | 6/2005 | |

OTHER PUBLICATIONS

English Translation for CN108255335A; Nov. 1, 2022; pp. 1-24 (Year: 2022).*

* cited by examiner

*Primary Examiner* — Jimmy H Nguyen
(74) *Attorney, Agent, or Firm* — K&L Gates LLP

(57) ABSTRACT

A detecting device includes a plurality of first electrodes extending in a first direction and a plurality of second electrodes extending in a second direction intersecting the first direction, the first electrodes and the second electrodes being disposed facing each other with an insulating layer interposed therebetween, a first electrode selection circuit configured to change a combination of a plurality of selected first electrodes for each of a plurality of periods obtained by dividing one frame period and supply a drive signal to the selected first electrodes, and a detection circuit configured to detect capacitance generated between the first electrodes and the second electrodes due to the drive signal. The first electrode selection circuit changes a frequency of the drive signal for each of the periods.

16 Claims, 8 Drawing Sheets

|  | t1 | t2 | t3 | t4 | t5 | t6 | t7 | t8 |
|---|---|---|---|---|---|---|---|---|
|  | CDM1 | CDM2 | CDM3 | CDM4 | CDM5 | CDM6 | CDM7 | CDM8 |
| Tx1 | 1 | 1 | 1 | 1 | 1 | 1 | 1 | 1 |
| Tx2 | 1 | 0 | 1 | 0 | 1 | 0 | 1 | 0 |
| Tx3 | 1 | 1 | 0 | 0 | 1 | 1 | 0 | 0 |
| Tx4 | 1 | 0 | 0 | 1 | 1 | 0 | 0 | 1 |
| Tx5 | 1 | 1 | 1 | 1 | 0 | 0 | 0 | 0 |
| Tx6 | 1 | 0 | 1 | 0 | 0 | 1 | 0 | 1 |
| Tx7 | 1 | 1 | 0 | 0 | 0 | 0 | 1 | 1 |
| Tx8 | 1 | 0 | 0 | 1 | 0 | 1 | 1 | 0 |

FIG.5

$$
(\text{FINGERPRINT PATTERN}) = \begin{pmatrix} 1 & 1 & 1 & 1 & -1 & -1 & -1 & -1 \\ 1 & 1 & 1 & -1 & -1 & -1 & 1 & 1 \\ 1 & 1 & -1 & -1 & -1 & 1 & 1 & 1 \\ 1 & -1 & -1 & -1 & 1 & 1 & 1 & -1 \\ -1 & -1 & -1 & 1 & 1 & 1 & -1 & -1 \\ -1 & -1 & 1 & 1 & 1 & -1 & -1 & -1 \\ -1 & 1 & 1 & 1 & -1 & -1 & -1 & 1 \\ 1 & 1 & 1 & -1 & -1 & -1 & 1 & 1 \end{pmatrix} \times \begin{pmatrix} D_{11} & D_{12} & D_{13} & D_{14} & D_{15} & D_{16} & D_{17} & D_{18} \\ D_{21} & D_{22} & D_{23} & D_{24} & D_{25} & D_{26} & D_{27} & D_{28} \\ D_{31} & D_{32} & D_{33} & D_{34} & D_{35} & D_{36} & D_{37} & D_{38} \\ D_{41} & D_{42} & D_{43} & D_{44} & D_{45} & D_{46} & D_{47} & D_{48} \\ D_{51} & D_{52} & D_{53} & D_{54} & D_{55} & D_{56} & D_{57} & D_{58} \\ D_{61} & D_{62} & D_{63} & D_{64} & D_{65} & D_{66} & D_{67} & D_{68} \\ D_{71} & D_{72} & D_{73} & D_{74} & D_{75} & D_{76} & D_{77} & D_{78} \\ D_{81} & D_{82} & D_{83} & D_{84} & D_{85} & D_{86} & D_{87} & D_{88} \end{pmatrix}
$$

FIG.7

$$\begin{bmatrix} D_{11} & D_{12} & D_{13} & D_{14} & D_{15} & D_{16} & D_{17} & D_{18} \\ 0 & 0 & 0 & 0 & 0 & 0 & 0 & 0 \\ D_{31} & D_{32} & D_{33} & D_{34} & D_{35} & D_{36} & D_{37} & D_{38} \\ D_{41} & D_{42} & D_{43} & D_{44} & D_{45} & D_{46} & D_{47} & D_{48} \\ D_{51} & D_{52} & D_{53} & D_{54} & D_{55} & D_{56} & D_{57} & D_{58} \\ D_{61} & D_{62} & D_{63} & D_{64} & D_{65} & D_{66} & D_{67} & D_{68} \\ D_{71} & D_{72} & D_{73} & D_{74} & D_{75} & D_{76} & D_{77} & D_{78} \\ D_{81} & D_{82} & D_{83} & D_{84} & D_{85} & D_{86} & D_{87} & D_{88} \end{bmatrix}$$

FIG.8

|  | t1<br>f1 [kHz] | t2<br>f2 [kHz] | t3<br>f3 [kHz] | t4<br>f4 [kHz] | t5<br>f5 [kHz] | t6<br>f6 [kHz] | t7<br>f7 [kHz] | t8<br>f8 [kHz] |
|---|---|---|---|---|---|---|---|---|
| FRAME 1 | 450 | 400 | 350 | 300 | 250 | 200 | 150 | 100 |
| FRAME 2 | 400 | 350 | 300 | 250 | 200 | 150 | 100 | 450 |
| FRAME 3 | 350 | 300 | 250 | 200 | 150 | 100 | 450 | 400 |
| FRAME 4 | 300 | 250 | 200 | 150 | 100 | 450 | 400 | 350 |
| FRAME 5 | 250 | 200 | 150 | 100 | 450 | 400 | 350 | 300 |
| FRAME 6 | 200 | 150 | 100 | 450 | 400 | 350 | 300 | 250 |
| FRAME 7 | 150 | 100 | 450 | 400 | 350 | 300 | 250 | 200 |
| FRAME 8 | 100 | 450 | 400 | 350 | 300 | 250 | 200 | 150 |
| FRAME 9 | 450 | 400 | 350 | 300 | 250 | 200 | 150 | 100 |
| ... | ... | ... | ... | ... | ... | ... | ... | ... |

DETECTING DEVICE AND DETECTION SYSTEM

CROSS-REFERENCE TO RELATED APPLICATION

This application claims the benefit of priority from Japanese Patent Application No. 2021-076583 filed on Apr. 28, 2021, the entire contents of which are incorporated herein by reference.

BACKGROUND

1. Technical Field

The present disclosure relates to a detecting device and a detection system.

2. Description of the Related Art

There have recently been demands for detecting a fingerprint used for personal authentication, for example, by a capacitive system. In detecting a fingerprint, electrodes with a smaller area are used than in detecting contact of a hand or a finger. To obtain signals from small electrodes, code division multiplexing drive that provides excellent detection sensitivity is employed. Code division multiplexing drive is a drive system that simultaneously selects a plurality of drive electrodes and supplies drive signals the phases of which are determined based on a predetermined code, to the selected drive electrodes (refer to Japanese Patent Application Laid-open Publication No. 2005-152223 (JP-A-2005-152223)). In the fingerprint sensor described in JP-A-2005-152223, a code generator generates a code corresponding to a plurality of column wires, and a column wiring driver divides the column wires into a first wiring group and a second wiring group based on the code and drives each of the groups.

In terms of operational stability and detection sensitivity, it is desirable for detecting devices to be less likely to be affected by noise. If a capacitive detecting device is coupled to an AC power source, for example, noise (hereinafter, referred to as external noise) caused by the AC power source or other components may possibly propagate to the detecting device due to the difference between the ground potential of a human body and the signal ground potential of the AC power source. If external noise synchronized with a clock frequency for acquiring data is superimposed on detection signals during detection, for example, the data may possibly overflow. As a result, the detecting device may possibly fail to perform excellent detection.

An object of the present disclosure is to provide a detecting device and a detection system that can reduce effects of external noise and achieve excellent fingerprint detection.

SUMMARY

A detecting device according to an embodiment of the present disclosure includes a plurality of first electrodes extending in a first direction and a plurality of second electrodes extending in a second direction intersecting the first direction, the first electrodes and the second electrodes being disposed facing each other with an insulating layer interposed therebetween, a first electrode selection circuit configured to change a combination of a plurality of selected first electrodes for each of a plurality of periods obtained by dividing one frame period and supply a drive signal to the selected first electrodes, and a detection circuit configured to detect capacitance generated between the first electrodes and the second electrodes due to the drive signal. The first electrode selection circuit changes a frequency of the drive signal for each of the periods.

A detection system according to an embodiment of the present disclosure includes a detecting device including a plurality of first electrodes extending in a first direction and a plurality of second electrodes extending in a second direction intersecting the first direction, the first electrodes and the second electrodes being disposed facing each other with an insulating layer interposed therebetween, a first electrode selection circuit configured to change a combination of a plurality of selected first electrodes for each of a plurality of periods obtained by dividing one frame period and supply a drive signal to the selected first electrodes, and a detection circuit configured to detect capacitance generated between the first electrodes and the second electrodes due to the drive signal, and a fingerprint pattern generating device configured to generate a fingerprint pattern based on an output from the detecting device. The first electrode selection circuit changes a frequency of the drive signal for each of the periods.

BRIEF DESCRIPTION OF THE DRAWINGS

FIG. 5 is a conceptual diagram of a specific example of fingerprint pattern generation according to the embodiment;

FIG. 7 is a diagram of an example of a square matrix obtained by replacing the second data row of the square matrix on the left of the left side illustrated in FIG. 5 with "0";

FIG. 8 is a diagram of an example of changing a clock frequency in each period for each frame.

DETAILED DESCRIPTION

Figure 1:
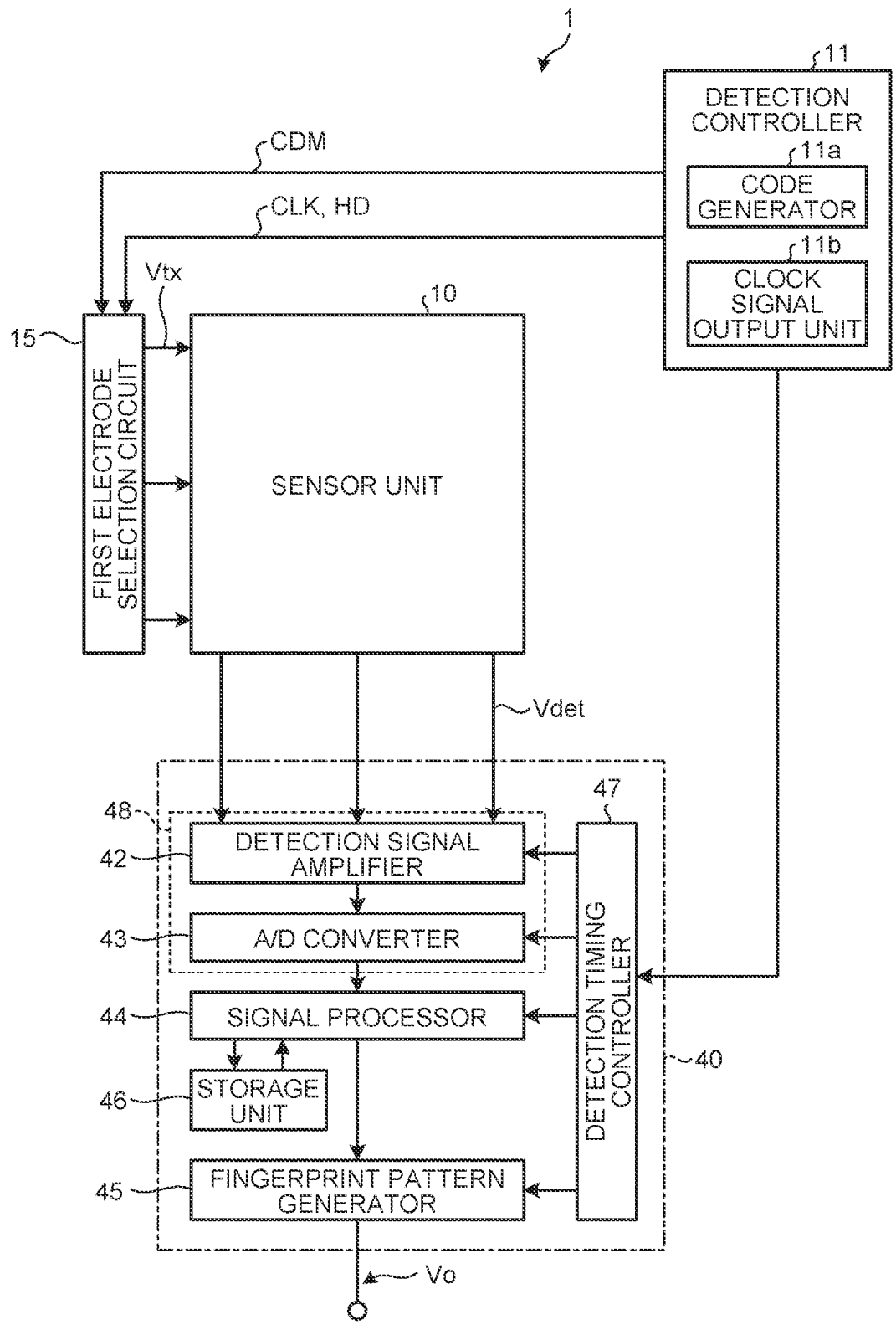
FIG. 1 is a block diagram of an example of the configuration of a detecting device according to an embodiment.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present disclosure and easily conceivable by those skilled in the art naturally fall within the scope of the present disclosure. To simplify the explanation, the drawings may possibly illustrate the width, the thickness, the shape, and other elements of each unit more schematically than those in the actual aspect. These elements, however, are given by way of example only and are not intended to limit interpretation of the present disclosure. In the present specification and the drawings, components similar to those previously described with reference to previously discussed drawings are denoted by like reference numerals, and detailed explanation thereof may be appropriately omitted.

FIG. 1 is a block diagram of an example of the configuration of a detecting device according to an embodiment. As illustrated in FIG. 1, a detecting device 1 according to the embodiment includes a sensor unit 10, a detection controller 11, a first electrode selection circuit 15, and a detector 40.

Figure 2:
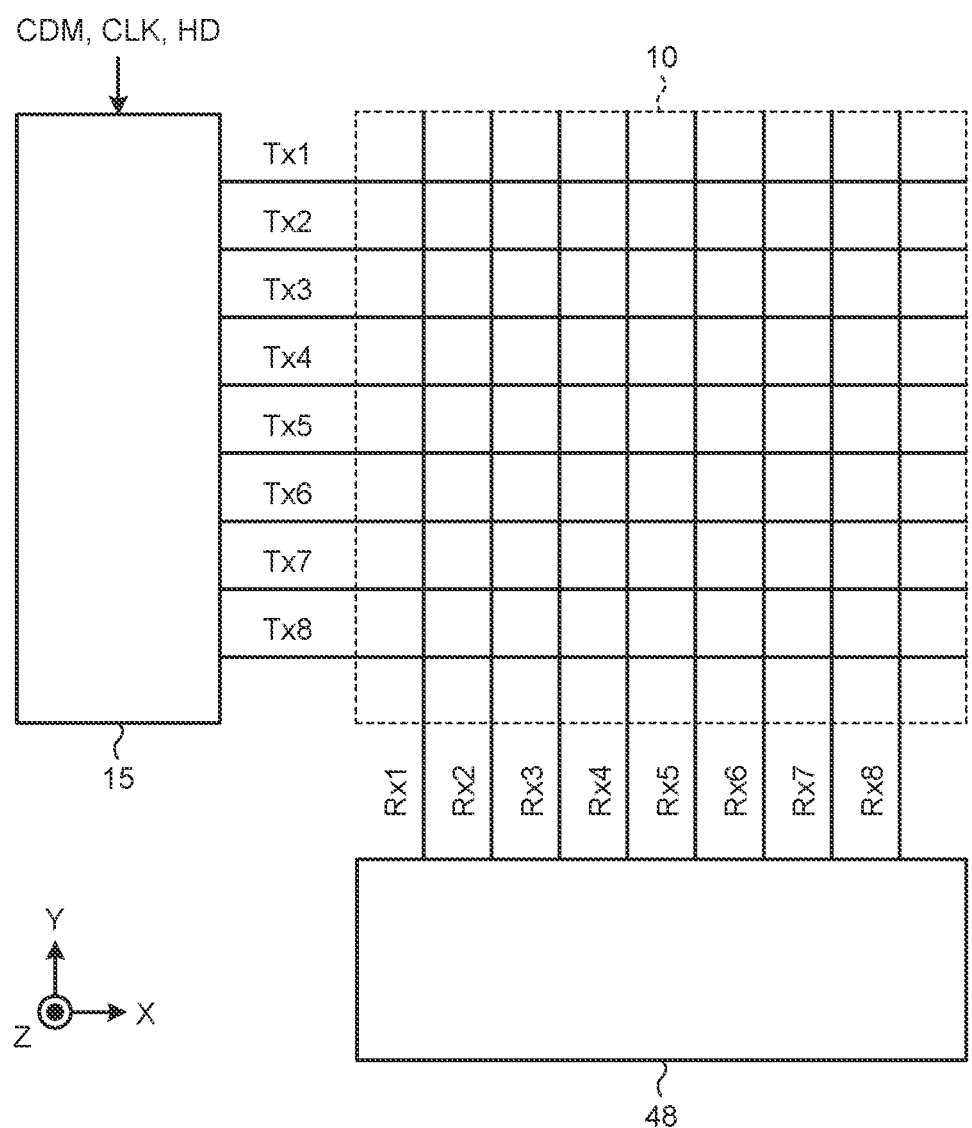
FIG. 2 is a schematic of the configuration of a sensor unit and a method for detecting a fingerprint pattern by the sensor unit.

FIG. 2 is a schematic of the configuration of the sensor unit and a method for detecting a fingerprint pattern by the sensor unit. The sensor unit 10 includes a plurality of first electrodes Tx and a plurality of second electrodes Rx. The first electrodes Tx extend in an X-direction and are arrayed in a Y-direction. The second electrodes Rx extend in the Y-direction and are arrayed in the X-direction. The first electrodes Tx and the second electrodes Rx face each other in a Z-direction in a non-contact state. The first electrodes Tx are coupled to the first electrode selection circuit 15. The second electrodes Rx are coupled to the detector 40.

While FIG. 2 illustrates an example where eight first electrodes Tx (Tx1, Tx2, . . . , and Tx8) and eight second electrodes Rx (Rx1, Rx2, . . . , and Rx8) are provided, the embodiment is not limited thereto. The number of first electrodes Tx and the number of second electrodes Rx can be an integer of 2 or larger and may be a multiple of 8, such as 64 and 128. The embodiment, for example, may have a plurality of regions each including a plurality of (eight in the example illustrated in FIG. 2) first electrodes Tx (Tx1, Tx2, . . . , and Tx8) and a plurality of (eight in the example illustrated in FIG. 2) second electrodes Rx (Rx1, Rx2, . . . , and Rx8) as one detection unit.

The sensor unit 10 performs detection based on drive signals Vtx supplied from the first electrode selection circuit 15 by code division multiplexing (CDM) drive.

The detection controller 11 is a circuit that supplies control signals to the first electrode selection circuit 15 and the detector 40 and controls their operations. The detection controller 11 includes a code generator 11a and a clock signal output unit 11b. The code generator 11a supplies the first electrode selection circuit 15 with a predetermined code signal CDM based on a predetermined code defined by the square matrix in the following Expression (1), for example. The order of the square matrix according to the present embodiment is 8 corresponding to the number of first electrodes Tx. The predetermined code is a code based on a square matrix the elements of which are either "1" or "−1" or either "1" or "0" and any two different rows of which are an orthogonal matrix, that is, a code based on a Hadamard matrix, for example. The clock signal output unit 11b supplies clock signals CLK and code switching signals HD to the first electrode selection circuit 15.

$$\begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} \quad (1)$$

Figures 3, 4:
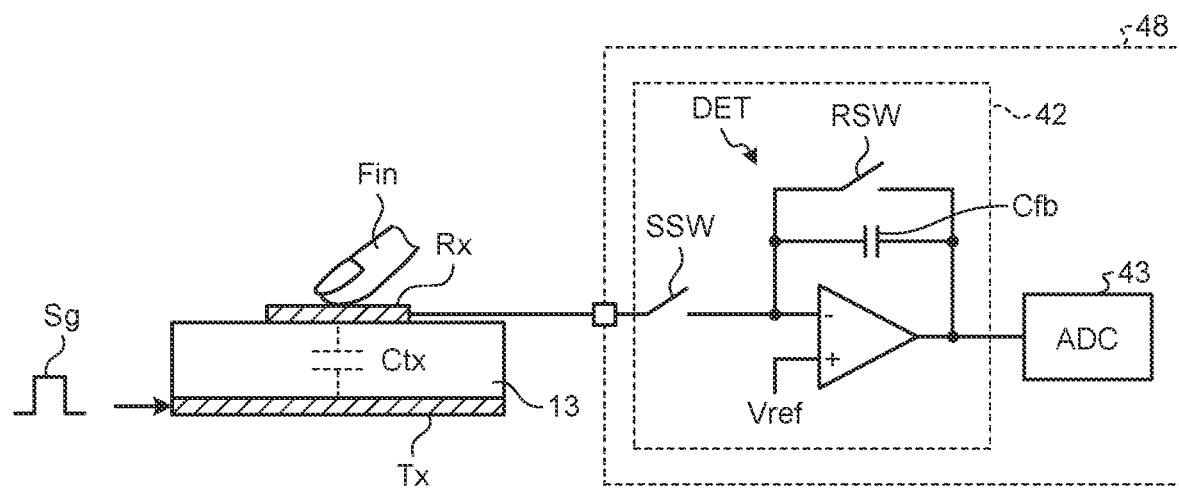
FIG. 3 is a diagram of an example of selection of first electrodes for each code signal.
FIG. 4 is a diagram for explaining detection control by a mutual capacitive system.

The first electrode selection circuit 15 selects the first electrodes Tx according to the code signal CDM based on the code switching signals HD for dividing one frame period into eight periods and outputs drive pulses synchronized with the clock signals CLK. FIG. 3 is a diagram of an example of selection of the first electrodes for each code signal.

Code signals CDM1, CDM2, . . . , and CDM8 are output in periods t1, t2, . . . , and t8, respectively, defined by the code switching signals HD for dividing one frame period into eight periods. In FIG. 3, "1" represents selecting the first electrode Tx, and "0" represents not selecting the first electrode Tx. If the sensor unit 10 has an image display function, image display periods may be arranged between the periods t1, t2, . . . , and t8.

In the period t1 when the code signal CDM1 is output, all the first electrodes Tx (Tx1, Tx2, . . . , and Tx8) illustrated in FIG. 2 are selected.

In the period t2 when the code signal CDM2 is output, the first electrodes Tx1, Tx3, Tx5, and Tx7 are selected, and the first electrodes Tx2, Tx4, Tx6, and Tx8 are not selected.

In the period t3 when the code signal CDM3 is output, the first electrodes Tx1, Tx2, Tx5, and Tx6 are selected, and the first electrodes Tx3, Tx4, Tx7, and Tx8 are not selected.

In the period t4 when the code signal CDM4 is output, the first electrodes Tx1, Tx4, Tx5, and Tx8 are selected, and the first electrodes Tx2, Tx3, Tx6, and Tx7 are not selected.

In the period t5 when the code signal CDM5 is output, the first electrodes Tx1, Tx2, Tx3, and Tx4 are selected, and the first electrodes Tx5, Tx6, Tx7, and Tx8 are not selected.

In the period t6 when the code signal CDM6 is output, the first electrodes Tx1, Tx3, Tx6, and Tx8 are selected, and the first electrodes Tx2, Tx4, Tx5, and Tx7 are not selected.

In the period t7 when the code signal CDM7 is output, the first electrodes Tx1, Tx2, Tx7, and Tx8 are selected, and the first electrodes Tx3, Tx4, Tx5, and Tx6 are not selected.

In the period t8 when the code signal CDM8 is output, the first electrodes Tx1, Tx4, Tx6, and Tx7 are selected, and the first electrodes Tx2, Tx3, Tx5, and Tx8 are not selected.

The detector 40 is a circuit that detects a fingerprint pattern based on the control signals supplied from the detection controller 11 and detection signals Vdet supplied from the sensor unit 10. The detector 40 includes a detection circuit 48, a signal processor 44, a fingerprint pattern generator 45, a storage unit 46, and a detection timing controller 47. The detection circuit 48 includes a detection signal amplifier 42 and an A/D converter 43.

The detection timing controller 47 controls the detection signal amplifier 42, the A/D converter 43, the signal processor 44, and the fingerprint pattern generator 45 such that they operate synchronously with one another based on the control signals supplied from the detection controller 11.

The sensor unit 10 supplies the detection signals Vdet to the detection circuit 48.

The detection signal amplifier 42 outputs signals Vout obtained by amplifying the detection signals Vdet supplied from the sensor unit 10. The A/D converter 43 converts analog signals output from the detection signal amplifier 42 into digital signals.

The signal processor 44 performs predetermined decoding on the signals Vout converted into digital signals.

The storage unit 46 temporarily stores therein data resulting from the decoding. The storage unit 46 may be a random access memory (RAM), a read only memory (ROM), or a register circuit, for example.

The fingerprint pattern generator 45 generates a fingerprint pattern based on the data resulting from the decoding and temporarily stored in the storage unit 46 and outputs the obtained fingerprint pattern as sensor output Vo.

The detecting device 1 performs capacitive detection control. The following describes detection control by a mutual capacitive system in the detecting device 1 according to the embodiment with reference to FIG. 4. FIG. 4 is a diagram for explaining detection control by the mutual capacitive system. FIG. 4 also illustrates the detection circuit 48. The detection circuit 48 includes a voltage detector DET for each of the second electrodes Rx. The voltage detector DET is provided to the detection signal amplifier 42. In other words, the detection signal amplifier 42 includes a plurality of voltage detectors DET corresponding to the respective second electrodes Rx.

As illustrated in FIG. 4, capacitance Ctx is formed by a pair of electrodes, that is, the first electrode Tx and the second electrode Rx, disposed facing each other with an insulating layer 13 interposed therebetween. The capacitance Ctx generates not only an electric field formed between the facing surfaces of the first electrode Tx and the second electrode Rx but also a fringe electric field extending from the ends of the first electrode Tx to the upper surface of the second electrode Rx. The insulating layer 13 can be composed of a single insulating film. Alternatively, the insulating layer 13 may be composed of a stack including a plurality of insulating films or a stack including a dielectric, an air layer, or a resin or glass substrate that supports the second electrode Rx, for example, in addition to these insulating films.

The drive signal supplied to the first electrode Tx is an AC square wave Sg at a predetermined frequency (e.g., a frequency of the order of several kilohertz to several hundred kilohertz), for example. An electric current corresponding to the capacitance Ctx flows through the voltage detector DET. The voltage detector DET converts fluctuations in electric current due to the AC square wave Sg into fluctuations in voltage.

The amplitude of a voltage signal output from the voltage detector DET becomes smaller as a finger Fin comes closer to the detection surface. The absolute value |ΔV| of the difference in voltage changes depending on the effects of an object to be detected in contact with or in proximity to the detection surface. The detector 40 determines recesses and protrusions or the like of the finger Fin based on the absolute value |ΔV|. In this manner, the detecting device 1 can perform control for detecting a fingerprint pattern by the mutual capacitive system.

FIG. 5 is a conceptual diagram of a specific example of fingerprint pattern generation according to the embodiment.

In FIG. 5, the square matrix on the left of the left side represents data obtained in each of the periods t1, t2, . . . , and t8 defined by the code switching signals HD. For example, $D_{11}$ represents data obtained by the second electrode Rx1 in the period t1. For example, $D_{88}$ represents data obtained by the second electrode Rx8 in the period t8. In other words, data $D_{11}, D_{12}, \ldots,$ and $D_{18}$ represent a data row obtained by the second electrodes Rx1, Rx2, . . . , and Rx8, respectively, in the period t1, and data $D_{11}, D_{21}, \ldots,$ and $D_{81}$ represent a data column obtained by the second electrode Rx1 in the periods t1, t2, . . . , and t8, respectively. In FIG. 5, the square matrix on the right of the left side is the code based on the Hadamard matrix described above.

If the detecting device 1 that performs capacitive detection control as described above is coupled to an AC power source, for example, noise (external noise) caused by the difference between the ground potential of a human body and the signal ground potential of the AC power source may possibly propagate to the detecting device. If external noise synchronized with the clock signals CLK is superimposed on the detection signals Vdet, for example, the data included in the square matrix on the left of the left side in FIG. 5 may possibly have abnormal values, thereby preventing the detecting device 1 from performing normal fingerprint detection.

Figure 6:
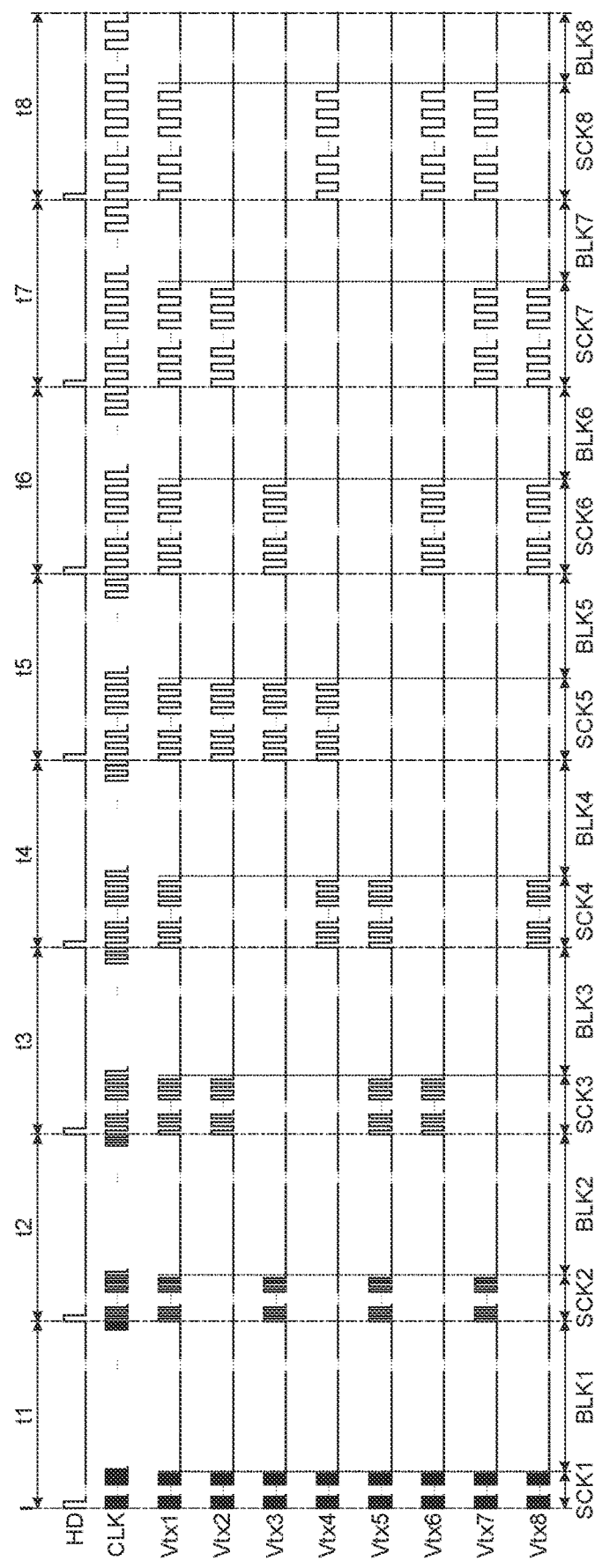
FIG. 6 is a timing chart of drive signals output to the first electrodes according to the embodiment.

FIG. 6 is a timing chart of drive signals output to the first electrodes according to the embodiment. In the example illustrated in FIG. 6, the periods t1, t2, . . . , and t8 are arranged in this order in one frame period. As illustrated in FIG. 6, the lengths of the respective periods t1, t2, . . . , and t8 are equal in one frame period. The numbers of drive pulses output in respective scanning periods SCK1, SCK2, SCK3, SCK4, SCK5, SCK6, SCK7, and SCK8 for outputting the drive pulses in the periods t1, t2, . . . , and t8 are equal. The total periods of the scanning periods SCK1, SCK2, SCK3, SCK4, SCK5, SCK6, SCK7, and SCK8 and blanking periods BLK1, BLK2, BLK3, BLK4, BLK5, BLK6, BLK7, and BLK8 are equal to the periods t1, t2, . . . , and t8, respectively. If the sensor unit 10 has an image display function, image display periods may be arranged between the periods as described above.

The first electrode selection circuit 15 according to the present disclosure changes the frequency of the drive pulse output in each of the periods t1, t2, . . . , and t8 as illustrated in FIG. 6. In other words, the detection controller 11 changes the frequency of the clock signal CLK output in each of the periods t1, t2, . . . , and t8. Specifically, the frequencies of the clock signal CLK input to the first electrode selection circuit 15 in the periods t1, t2, . . . , and t8 differ from each other.

In the example illustrated in FIG. 6, the frequency of the clock signal CLK in the period t1 is f1, the frequency of the clock signal CLK in the period t2 is f2 (hereinafter, also simply referred to as a "clock frequency f2"), the frequency of the clock signal CLK in the period t3 is f3 (hereinafter, also simply referred to as a "clock frequency f3"), the frequency of the clock signal CLK in the period t4 is f4 (hereinafter, also simply referred to as a "clock frequency f4"), the frequency of the clock signal CLK in the period t5 is f5 (hereinafter, also simply referred to as a "clock frequency f5"), the frequency of the clock signal CLK in the period t6 is f6 (hereinafter, also simply referred to as a "clock frequency f6"), the frequency of the clock signal CLK in the period t7 is f7 (hereinafter, also simply referred to as a "clock frequency f7"), and the frequency of the clock signal CLK in the period t8 is f8 (hereinafter, also simply referred to as a "clock frequency f8"). The magnitude relation among the clock frequency f1, the clock frequency f2, the clock frequency f3, the clock frequency f4, the clock frequency f5, the clock frequency f6, the clock frequency f7, and the clock frequency f8 is expressed by the following Expression (2):

$$f1 > f2 > f3 > f4 > f5 > f6 > f7 > f8 \qquad (2)$$

The first electrode selection circuit 15 outputs the drive pulses synchronized with the clock signals CLK at different frequencies in the periods t1, t2, . . . , and t8. With this operation, the detecting device 1 can reduce effects of external noise.

The magnitude relation among the clock frequency f1 in the period t1, the clock frequency f2 in the period t2, the clock frequency f3 in the period t3, the clock frequency f4 in the period t4, the clock frequency f5 in the period t5, the clock frequency f6 in the period t6, the clock frequency f7 in the period t7, and the clock frequency f8 in the period t8 is not necessarily as expressed by Expression (2) and may be as expressed by the following Expression (3), for example.

Alternatively, different clock frequencies f1, f2, f3, f4, f5, f6, f7, and f8 may appear randomly.

$$f1 < f2 < f3 < f4 < f5 < f6 < f7 < f8 \quad (3)$$

If external noise is superimposed on the detection signal Vdet detected by the second electrode Rx, for example, the detection signal Vdet may possibly have an abnormal value due to the external noise, and data output from the detection circuit 48 of the detector 40 may possibly have an excessive value. To address this, the signal processor 44 of the detector 40 according to the present disclosure replaces data in a data row including data of equal to or larger than a predetermined threshold with "0" data.

FIG. 7 is a diagram of an example of a square matrix obtained by replacing the second data row of the square matrix on the left of the left side illustrated in FIG. 5 with "0". When data $D_{24}$ acquired by the second electrode Rx4 in the period t2 is equal to or larger than a threshold Dth, for example, the signal processor 44 of the detector 40 replaces the second data row with "0" as illustrated in FIG. 7.

With this operation, the detecting device 1 can eliminate data having an excessive value due to external noise.

The first electrode selection circuit 15 according to the present disclosure changes the frequency of the drive pulse output in each of the periods for each frame. In other words, the detection controller 11 changes the frequency of the clock signal CLK output in each of the periods t1, t2, . . . , and t8 for each frame. Specifically, the frequencies of the clock signal CLK input to the first electrode selection circuit 15 in the periods t1, t2, . . . , and t8 differ from each other for each frame.

FIG. 8 is a diagram of an example of changing the clock frequency in each of the periods for each frame. In the example illustrated in FIG. 8, the frequencies f1, f2, f3, f4, f5, f6, f7, and f8 of the clock signal CLK output in the periods t1, t2, . . . , and t8, respectively, are shifted by 50 kHz for each frame. Specifically, in the example illustrated in FIG. 8, the drive frequency (400 kHz) in the period t1 in a frame 2 is lower than the drive frequency (450 kHz) in the period t1 in a frame 1, for example. Alternatively, the drive frequency in the period t1 in the frame 2 may be higher than the drive frequency in the period t1 in the frame 1, for example. As described above, the frequencies f1, f2, f3, f4, f5, f6, f7, and f8 of the clock signal CLK output in the periods t1, t2, . . . , and t8, respectively, are changed for each frame. With this operation, the detecting device 1 can prevent data acquired in the same period in each frame from having an excessive value if external noise synchronized with any clock signal CLK or odd number of times of the clock signal CLK is superimposed.

The examples of changing the clock frequency f1, the clock frequency f2, the clock frequency f3, the clock frequency f4, the clock frequency f5, the clock frequency f6, the clock frequency f7, and the clock frequency f8 are not limited to the aspect illustrated in FIG. 7. Alternatively, different clock frequencies f1, f2, f3, f4, f5, f6, f7, and f8 may appear randomly, for example.

With the operations described above, the detecting device 1 according to the embodiment can achieve excellent fingerprint detection using data less affected by external noise.

Figure 9:
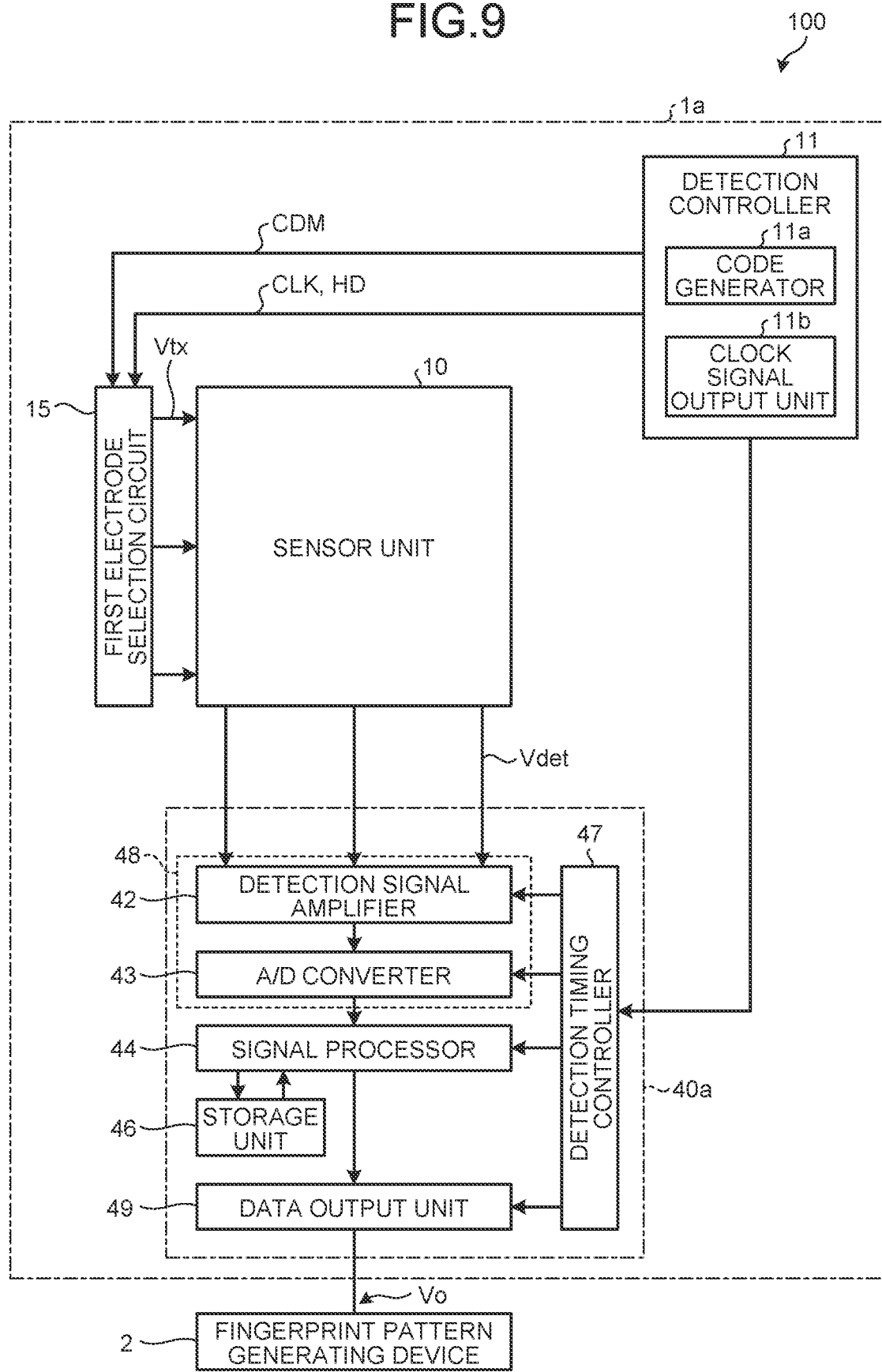
FIG. 9 is a block diagram of an example of the configuration of a detection system according to the embodiment.

FIG. 9 is a block diagram of an example of the configuration of a detection system according to the embodiment. The same components as those of the detecting device 1 illustrated in FIG. 1 are denoted by like reference numerals, and detailed explanation thereof is omitted.

As illustrated in FIG. 9, a detection system 100 according to the embodiment includes a detecting device 1a and a fingerprint pattern generating device 2. The detecting device 1a includes the sensor unit 10, the detection controller 11, the first electrode selection circuit 15, and a detector 40a.

In the detection system 100 illustrated in FIG. 9, a detection timing controller 47a of the detecting device 1a controls the detection signal amplifier 42, the A/D converter 43, the signal processor 44, and a data output unit 49 such that they operate synchronously with one another based on the control signals supplied from the detection controller 11. The data output unit 49 outputs data resulting from decoding and temporarily stored in the storage unit 46 to the fingerprint pattern generating device 2 as the sensor output Vo. The fingerprint pattern generating device 2 generates a fingerprint pattern by the fingerprint pattern generation illustrated in FIG. 5 based on the sensor output Vo output from the detector 40a.

Similarly to the detecting device 1 illustrated in FIG. 1, the detection system 100 according to the embodiment illustrated in FIG. 9 can also achieve excellent fingerprint detection using data less affected by external noise.

While exemplary embodiments according to the present disclosure have been described, the embodiments are not intended to limit the disclosure. The contents disclosed in the embodiments are given by way of example only, and various modifications may be made without departing from the spirit of the present disclosure. Appropriate modifications made without departing from the spirit of the present disclosure naturally fall within the technical scope of the disclosure. At least one of the various omissions, substitutions, and modifications of the components may be made without departing from the gist of the embodiments above and the modifications thereof.

What is claimed is:

1. A detecting device comprising:
a plurality of first electrodes extending in a first direction and a plurality of second electrodes extending in a second direction intersecting the first direction, the first electrodes and the second electrodes being disposed facing each other with an insulating layer interposed therebetween;
a first electrode selection circuit configured to change a combination of a plurality of selected first electrodes for each of a plurality of periods obtained by dividing one frame period and supply a drive pulse synchronized with a clock signal to the selected first electrodes; and
a detection circuit configured to detect capacitance generated between the first electrodes and the second electrodes due to the drive pulse, wherein
the first electrode selection circuit changes a frequency of the clock signal for each of the periods.

2. The detecting device according to claim 1, wherein the detection circuit replaces a value of data acquired in a period when data having a detected value of equal to or larger than a predetermined threshold is detected with zero.

3. The detecting device according to claim 1, wherein the first electrode selection circuit changes the frequency of the clock signal in each of the periods for each frame.

4. The detecting device according to claim 1, wherein
the periods include a first period and a second period arranged in order in one frame period, and
the first electrode selection circuit makes the frequency of the clock signal in the second period lower than the frequency of the clock signal in the first period.

5. The detecting device according to claim 4, wherein the first electrode selection circuit makes the frequency of the clock signal in the first period in a second frame lower than the frequency of the clock signal in the first period in a first frame, the first frame and the second frame being arranged in order.

6. The detecting device according to claim 4, wherein the first electrode selection circuit makes the frequency of the clock signal in the first period in a second frame higher than the frequency of the clock signal in the first period in a first frame, the first frame and the second frame being arranged in order.

7. The detecting device according to claim 1, wherein
the periods include a first period and a second period arranged in order in one frame period, and
the first electrode selection circuit makes the frequency of the clock signal in the second period higher than the frequency of the clock signal in the first period.

8. The detection device according to claim 7, wherein the first electrode selection circuit makes the frequency of the clock signal in the first period in a second frame lower than the frequency of the clock signal in the first period in a first frame, the first frame and the second frame being arranged in order.

9. The detection device according to claim 7, wherein the first electrode selection circuit makes the frequency of the clock signal in the first period in a second frame higher than the frequency of the clock signal in the first period in a first frame, the first frame and the second frame being arranged in order.

10. A detection system comprising:
a detecting device comprising:
a plurality of first electrodes extending in a first direction and a plurality of second electrodes extending in a second direction intersecting the first direction, the first electrodes and the second electrodes being disposed facing each other with an insulating layer interposed therebetween;
a first electrode selection circuit configured to change a combination of a plurality of selected first electrodes for each of a plurality of periods obtained by dividing one frame period and supply a drive pulse synchronized with a clock signal to the selected first electrodes; and
a detection circuit configured to detect capacitance generated between the first electrodes and the second electrodes due to the drive pulse; and
a fingerprint pattern generating device configured to generate a fingerprint pattern based on an output from the detecting device, wherein
the first electrode selection circuit changes a frequency of the clock signal for each of the periods.

11. The detection system according to claim 10, wherein the detection circuit replaces a value of data acquired in a period when data having a detected value of equal to or larger than a predetermined threshold is detected with zero.

12. The detection system according to claim 10, wherein the first electrode selection circuit changes the frequency of the clock signal in each of the periods for each frame.

13. The detection system according to claim 10, wherein
the periods include a first period and a second period arranged in order in one frame period, and
the first electrode selection circuit makes the frequency of the clock signal in the second period lower than the frequency of the clock signal in the first period.

14. The detection system according to claim 13, wherein the first electrode selection circuit makes the frequency of the clock signal in the first period in a second frame lower than the frequency of the clock signal in the first period in a first frame, the first frame and the second frame being arranged in order.

15. The detection system according to claim 13, wherein the first electrode selection circuit makes the frequency of the clock signal in the first period in a second frame higher than the frequency of the clock signal in the first period in a first frame, the first frame and the second frame being arranged in order.

16. The detection system according to claim 10, wherein
the periods include a first period and a second period arranged in order in one frame period, and
the first electrode selection circuit makes the frequency of the clock signal in the second period higher than the frequency of the clock signal in the first period.

* * * * *